United States Patent Office 2,995,920
Patented Aug. 15, 1961

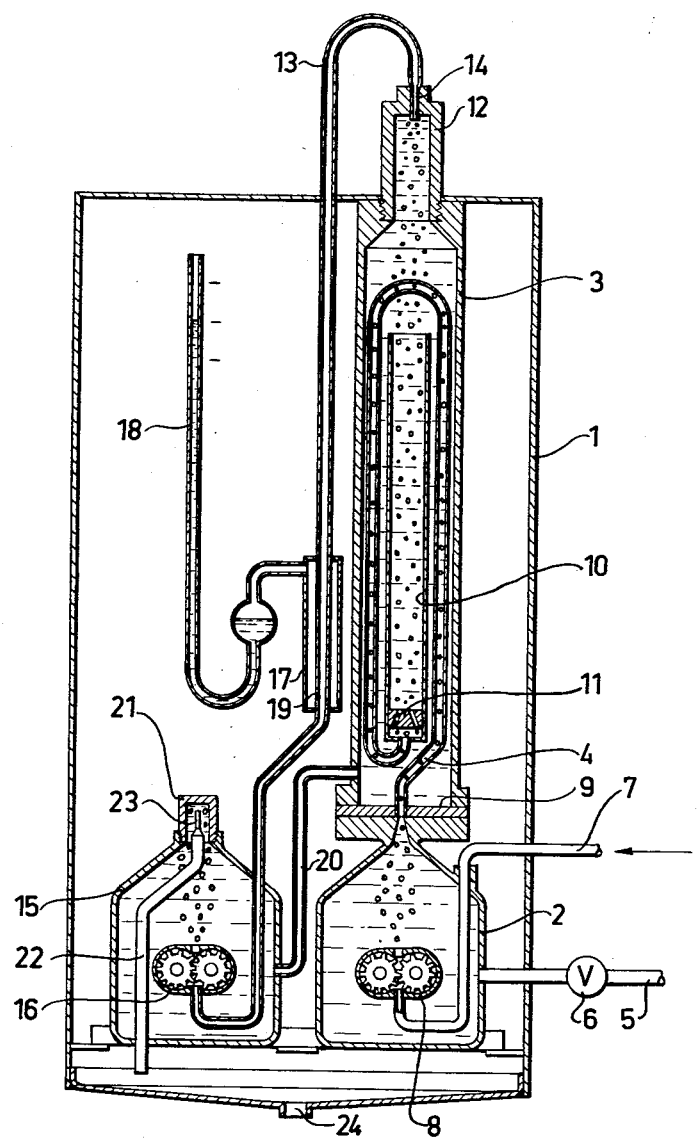

2,995,920
GAS ABSORPTION APPARATUS
Karl Torsten Källe, Sandbacken, Säffle, Sweden
Filed Nov. 7, 1957, Ser. No. 695,044
Claims priority, application Sweden Dec. 5, 1956
5 Claims. (Cl. 73—23)

The invention relates to a gas absorption apparatus for the continuous determination of the amount of liquid soluble gas constituents in a gas mixture, for instance carbon dioxide in combustion gases or sulphur dioxide in various industrial gases.

An absorption apparatus previously known comprises a vessel having an inlet and an outlet for the continuous passage of absorption liquid. The suction side of a pump driven at constant speed is connected to the source of gas to be controlled, whereas the outlet from the pressure side of the pump ends below the liquid level in the vessel. A conduit extending from the top of the vessel is connected to the suction side of another pump driven at constant speed and sucking the amount of gas not absorbed by the liquid. The pressure in the suction conduit then becomes dependent on the amount of gas absorbed and is indicated by means of an inserted pressure indicating apparatus.

The invention relates to an appartus of this type and has for its particular object to render possible an absorption at overpressure, whereby also less easily soluble gases, such as for instance carbon dioxide in water, can be absorbed effectively or almost to 100%. According to the invention, means are provided for supplying liquid to the vessel at a substantially constant super-atmospheric pressure and the outlet for liquid from the vessel contains a restricted passage to maintain a desired super-atmospheric pressure within the vessel. Further, the suction conduit for gas has a restricted inlet passage at the top of the vessel, whereby substantially only gas escapes this way.

The absorption apparatus according to the invention is described in detail with reference to the accompanying drawing which shows a suitable embodiment.

Except for an upper, projecting portion, the apparatus is enclosed in a casing 1. In the embodiment shown, the absorption vessel consists of two compartments, a lower bottle 2 and a rather elongated upper cylinder 3. The two compartments communicate with each other through a pipe 4. A conduit 5 for the supply of liquid (usually water) under pressure is introduced through the wall of the bottle 2. A reduction valve 6 for setting a desired super-atmospheric pressure, preferably about 1 atm. gauge, may be inserted in the conduit 5, or instead, the conduit 5 may be drawn from a container which is placed at a higher level and in which the liquid level is kept constant.

The gas to be analysed is supplied through a conduit 7 passing through the wall of the bottle 2 and connected to the suction side of a gear pump 8 mounted within the bottle. Though not shown, one gear wheel of the pump is mounted on a driving shaft which passes through a packing box inserted in the wall of the bottle. Outside the bottle said shaft is connected to a motor operating at a constant speed. At the pressure side of the pump a constant amount of gas is discharged per unit of time in the form of finely divided bubbles rising towards the mouth of the bottle. The pipe 4 extends from said mouth through the bottom 9 of the cylinder and upwards along the inner wall of the cylinder. In the upper part of the cylinder the pipe 4 is bent downwards along the opposite part of the cylinder wall. The pipe coil thus formed is near the bottom of the cylinder 3 connected to the lower end of a wider tube 10 mounted axially within the cylinder 3. The upper end of this wider tube 10 ends closely below the upper bend of the coil 4. The lower end of the tube 10 contains a nozzle in which the gas bubbles will be still more finely divided. As shown, said nozzle may consist of a plug 11 having two narrow channels converging upwards.

The cylinder 3 has a narrower top portion 12 projecting above the casing 1. Said top portion may be of a transparent material to render observations possible. A conduit 13 extending from the top of the cylinder has an inlet consisting of a narrow, almost capillary passage or channel 14 which may have an inner diameter of about 1 mm. The conduit 13 extends downwards along the outer side of the cylinder 3, passes through the wall of a bottle 15 of approximately the same size as the bottle 2 mentioned above, and ends at the suction side of a gear pump 16 mounted within the bottle 15 and driven at a constant speed by a motor in the same way as the pump 8. The pumps may preferably be of equal size and may be driven by a common motor so that no difference in speed occurs.

Outside the bottle 15 the conduit 13 passes axially through a cylindric container 17, the upper end of which is connected to a mercury manometer 18. A hole 19 is provided in the wall of the conduit 13 slightly above the bottom of the container, whereby the manometer will be subjected to the pressure prevailing in the conduit 13. The container 17 has for its purpose to dampen possible pressure shocks and to receive drops of liquid carried by the gas in the conduit 13. The liquid never reaches any high level in the container but for the greater part it flows back into the conduit 13 to be forwarded to the pump 16. It is suitable to graduate the mercury manometer in such a way that the percentage of gas absorbed may be directly read. Instead of a mercury manometer it is, of course, possible to use any kind of pressure indicating apparatus which gives a sufficiently exact value.

The lower part of the cylinder 3 communicates with the bottle 15 through a conduit 20. Further, an outlet conduit 22 has its inlet end placed within a cup-shaped top portion of the bottle 15. The conduit 22 has a slightly restricted inlet end 23, the inner diameter of which is for instance about 2 mm. The conduit 22 passes through the bottom of the bottle and ends closely thereunder. The water then flows off through an outlet 24 provided in the bottom of the casing.

In combination with the restricted outlets 14 and 23, the valve 6 in the liquid supply conduit makes it possible to maintain a rather high and substantially constant super-atmospheric pressure of for instance 1 atm. gauge in the liquid system despite the continuous operation, and this circumstance contributes highly to a rapid and complete absorption of the liquid soluble gas constituents. Also other constructional details are of great importance, as will be explained below.

The absorption liquid supplied to the bottle 2 forces the gas from the pump 8 through the pipe 4 in the form of a row of bubbles separated by small intermediate liquid columns. An effective absorption is thus obtained owing to this intimate mixture. When passing through the narrow channels in the plug 11 the gas bubbles will be still more finely divided and an absorption of the remaining soluble gas constituents then occurs in the wider tube 10. The speed of the liquid is here slower owing to the greater volume, so that the small bubbles have the opportunity to rise towards the top of the cylinder 3. The calmer liquid movement obtained in the tube 10 has proved to have a favourable influence on the efficiency of the absorption, which is fully in conformity with the known fact that a violent stirring of a liquid containing dissolved gases easily causes a stripping of the gases.

The remaining gas consisting substantially of non-absorbable gas constituents rises to the top of the cylinder 3 and escapes through the restricted passage 14 into the conduit 13. Only insignificant amounts of liquid are entrained by the gas passing this way as a liquid passes through a capillary channel less easily than a gas. Instead, the liquid moves downwards through the annular space between the tube 10 and the wall of the cylinder 3 and flows off through the conduit 20 to the second bottle 15. From there the liquid as well as the gas supplied by the pump 16 are forced out through the outlet pipe 22. The inlet end 23 of said pipe 22 is dimensioned to offer a resistance sufficient to maintain the desired super-atmospheric pressure in the absorption vessel 2, 3.

Owing to the restricted passage 14, the gas pressure in the conduit 13 is entirely independent of the pressure in the cylinder 3, and as the pump 16 sucks a constant volume of gas per unit of time said gas pressure will be dependent exclusively on the amount of gas passing. Thus, when the manometer indicates an increased gas pressure in the conduit 13, this means a decreased proportion of absorbable gases in the gas mixture supplied through the conduit 7. The apparatus may be calibrated by means of gases, the compositions of which are previously known, and the manometer can be graduated to indicate directly the percentage of absorbable gases.

In the embodiment shown, the two pumps have preferably the same capacity, though this is not absolutely necessary.

The two pumps 8 and 16 may also be mounted outside the vessels 2 and 15 respectively, in which case the restricted passage 23 may instead be provided in the conduit 20 and the vessel 15 may be entirely dispensed with. Although not shown in the drawing, the bottles must of course be provided with removable bottoms or the like, if the pumps are to be mounted therein.

The apparatus described may be modified or altered with regard to a number of other details within the scope of the inventive idea. For instance, the cylinder 3 need not be located above the bottle 2 but may be on the same level, and the pipe coil 4 may very well be provided outside the cylinder, although the compact construction shown is preferred, i.e. in view of the desire to maintain a constant temperature in the whole absorption system.

What I claim is:

1. An absorption apparatus for the continuous indication of the proportion of liquid soluble and insoluble gas constituents in a gas mixture, comprising an absorption vessel having an inlet and an outlet for the continuous passage of liquid, means for supplying liquid through the inlet at a substantially constant super-atmospheric pressure, a restricted passage in the outlet for maintaining a desired pressure within the vessel, a constant speed pump having its suction side connected to the source of gas to be tested, while its pressure side ends below the liquid level in the vessel, a second constant speed pump, a conduit extending from the top of the vessel to the suction side of said second pump, a restricted passage between said vessel and said suction conduit, and a pressure indicating apparatus connected to the suction conduit to indicate the gas pressure therein.

2. An absorption apparatus for the continuous indication of the proportion of liquid soluble and insoluble gas constituents in a gas mixture, comprising an absorption vessel having two compartments for the passage of liquid therethrough, the first compartment having an inlet for liquid, means for supplying liquid through said inlet at a substantially constant super-atmospheric pressure, a constant speed pump having its suction side connected to the source of gas to be tested, while its pressure side ends within said first compartment, a pipe coil extending from the top of said first compartment to the second compartment, said second compartment having a restricted outlet passage for liquid in the bottom thereof for maintaining a desired pressure within the vessel, a second constant speed pump, a conduit extending from the top of the second compartment to the suction side of said second pump, said suction conduit having a restricted inlet thereto, and a pressure indicating apparatus connected to the suction conduit to indicate the gas pressure therein.

3. An absorption apparatus for the continuous indication of the proportion of liquid soluble and insoluble gas constituents in a gas mixture, comprising an absorption vessel having two compartments for the passage of liquid therethrough, the first compartment having an inlet for liquid, means for supplying liquid through said inlet at a substantially constant super-atmospheric pressure, a constant speed pump having its suction side connected to the source of gas to be tested, while its pressure side ends within said first compartment, a rather narrow pipe coil extending from the top of said first compartment, a wider vertical tube opening into the second compartment to the bottom of which wider tube is connected said narrow pipe coil, a spray nozzle inserted between the pipe coil and the wider tube, said second compartment having a restricted outlet passage for liquid from the bottom thereof for maintaining a desired pressure within the vessel, a second constant speed pump, a conduit extending from the top of the second compartment to the suction side of said second pump, a restricted inlet passage between said second compartment and said suction conduit, and a pressure indicating apparatus connected to the suction conduit to indicate the gas pressure therein.

4. An absorption apparatus for the continuous indication of the proportion of liquid soluble and insoluble gas constituents in a gas mixture, comprising an absorption vessel having two compartments for the passage of liquid therethrough, the first compartment having an inlet for liquid, means for supplying liquid through said inlet at a substantially constant super-atmospheric pressure, a constant speed pump having its suction side connected to the source of gas to be controlled, while its pressure side ends within said first compartment, a rather narrow pipe coil extending from the top of said first compartment, a wider vertical tube mounted centrally within the second compartment and ending in the upper portion of said second compartment and to the bottom of which is connected said narrow pipe coil, a spray nozzle inserted between the pipe coil and the wider tube, said second compartment having a restricted outlet passage for liquid from the bottom thereof for maintaining a desired pressure within the vessel, a second constant speed pump, a conduit extending from the top of the second compartment to the suction side of a second pump, said suction conduit having a restricted inlet, and a pressure indicating apparatus connected to the suction conduit to indicate the gas pressure therein.

5. An absorption apparatus for the continuous indication of the proportion of liquid soluble and insoluble gas constituents in a gas mixture, comprising an absorption vessel having an inlet and an outlet for the continuous passage of liquid, means for supplying liquid through the inlet at a substantially constant super-atmospheric pressure, a constant speed pump having its suction side connected to the source of gas to be controlled, while its pressure side ends below the liquid level in the vessel, a second constant speed pump, a conduit extending from the top of the vessel to the suction side of said second pump, said suction conduit having a restricted inlet, a pressure indicating apparatus connected to the suction conduit to indicate the gas pressure therein, a second vessel connected to the pressure side of said second pump, an outlet conduit for liquid connected between the first vessel and the second vessel, and a restricted outlet passage from the second vessel for maintaining a desired pressure within the system.

References Cited in the file of this patent

UNITED STATES PATENTS

| | | |
|---|---|---|
| 2,086,778 | Reffer et al. | July 13, 1937 |
| 2,620,666 | Schmidt | Dec. 9, 1952 |
| 2,719,425 | Kalle | Oct. 4, 1955 |